United States Patent Office 3,734,743
Patented May 22, 1973

---

3,734,743
SOUR DOUGH FRENCH BREAD
Leo Kline, Richmond, and Takashi F. Sugihara, Pinole, Calif., assignors to the United States of America as represented by the Secretary of Agriculture
No Drawing. Filed Feb. 26, 1971, Ser. No. 119,382
Int. Cl. A21d 8/04
U.S. Cl. 99—90 S                              9 Claims

ABSTRACT OF THE DISCLOSURE

Processes for preparing sour dough French bread using a novel liquid starter which supplies the special microorganisms, *Lactobacillus sanfrancisco* and *Torulopsis holmii*, required for leavening and souring action and which provides many advantages over conventional sponge starters.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of novel processes for preparing sour dough French bread. Further objects of the invention will be evident from the following description wherein parts and percentages are by weight unless otherwise specified. In describing formulations of doughs, starters, etc., percentages of ingredients are based on the amount of flour in the formulation.

Sour dough French bread is a special kind of bread preferred by many for its unique properties, including its crustiness and its appealing sour taste. In the United States, the true article is manufactured virtually only in San Francisco Bay Area. There, the product has been produced continuously for over 100 years and commands a market estimated to be 15 to 20% of all bread consumed. In addition, the product is exported to other areas of the United States and to foreign countries. Virtually everyone who has had occasion to visit San Francisco recalls with pleasure their encounter with sour dough French bread, and expresses regret that this product is not manufactured in their own locality. One of the objects of the invention is to provide the means whereby the unique product can be manufactured efficiently, economically, and in any location regardless of climate or topography.

In order to place the invention in proper focus, it is necessary to outline the method by which sour dough French bread is conventionally produced in San Francisco Bay Area establishments.

The heart of the process is the starter—or mother sponge, as it is commonly called. This sponge is not only the source of the leavening and souring powers, but it also provides the mechanism for perpetuating the process. In commercial practice, the sponge is rebuilt on the average of about every 8 hours, or at least 2 to 3 times a day, seven days a week. The procedure has been carried on in this fashion for at least 100 years, and the origin of the initial sponge is veiled in mystery.

The aforesaid sponge is made up from previous sponge, water, and a high gluten flour (e.g., one containing approximately 14% protein), these ingredients being typically used in the following proportions.

SPONGE FORMULATION

|  | Parts |
|---|---|
| Previous sponge | 50–100 |
| Flour (high gluten) | 100 |
| Water | 45–52 |

After mixing, the sponge is held (developed) for 7–8 hours at 75 to 80° F. Then it is ready for use in preparing a batch of dough. The pH of the sponge when made up is 4.4 to 4.5; final pH is 3.8 to 3.9.

In preparing a batch of dough, the aforesaid developed sponge is mixed with flour, water, and salt, typically in the following proportions:

DOUGH FORMULATION

|  | Parts |
|---|---|
| Sponge | 15–20 |
| Flour (regular patent) | 100 |
| Water | 60 |
| Salt | 2 |

After make-up the dough is allowed to relax for at least 30 minutes at 75–80° F. Then it is scaled (divided into pieces of predetermined weight), rounded, and given an overhead proof of about 20 minutes at 90° F., after which it is molded, placed on canvas which is first dusted with rice flour and/or corn meal and allowed to proof about 6–8 hours at 85–90° F. and at 70–90% relative humidity. The loaves are then baked in a hearth oven for 45–55 minutes at 375–390° F. The atmosphere within the oven is kept very wet by saturating it with steam, particularly during the first half of the baking cycle. Also, just prior to baking, the tops of the loaves are slashed with a knife to prevent splitting and wrinkling of the crust during baking.

Although the conventional procedure outlined above yields an excellent product, it is subject to certain disadvantages (as explained below), and a primary object of the invention is to provide a procedure which obviates these disadvantages.

Another topic of significance in the production of San Francisco sour dough French bread lies in the microbiological aspects thereof. Although the product has been produced for at least 100 years, the microbial factors have not heretofore been discovered. It has always been known, of course, that some microbial action was involved and responsible for the leavening action and development of sourness; however, the nature of the organism or organisms has remained unknown. Our investigations have revealed that two distinct organisms are involved.

One is a yeast which is responsible for leavening action. This yeast we have identified as the imperfect (non-sporulating) form of *Saccharomyces exiguus*, namely, *Torulopsis holmii*. One of the properties differentiating this yeast from ordinary baker's yeast (*S. cereviseae*) is that it cannot ferment or grow on maltose; it can ferment glucose, sucrose, raffinose, and galactose. *S. cereviseae*, on the other hand, can ferment all five of the named sugars. Another item is that *T. holmii* can grow in media containing acetic acid. This is demonstrated as follows: Ten percent flour suspensions in water were adjusted to pH 4.5 with acetic acid and separate portions were inoculated with baker's yeast and *T. holmii*. After 6 hours incubation at 80° F., the count of viable baker's yeast cells decreased to less than 0.1% of the original number, whereas the *T. holmii* multiplied five-fold. It may be observed that although *T. holmii* is a known species of yeast, it was not previously known to be involved in sour dough French bread production.

The other microorganism involved in sour dough French bread we found to be a species of bacterium, closely related to or belonging in the genus Lactobacillus, and which species has not heretofore been known or described. This bacteria is responsible for the development of sourness in the product, and, as the discoverers, we have suggested the name *Lactobacillus sanfrancisco* therefor. One of the characteristics of this bacterial species is that it requires or greatly prefers maltose for its growth, and that in most cases a relatively high concentration (above 0.5%) of maltose is required for good growth. Other sugars including xylose, arabinose, galactose, lactose, sucrose, raffinose, and rhamnose are not utilized. Some isolates of the bacteria can adapt to glucose, but only after a long lag period. The sour dough bacteria, *L. sanfrancisco,* is described in detail together with techniques for growing it, etc. in our copending application, Ser. No. 119,381, filed Feb. 26, 1971, the disclosure of which is incorporated herein by reference.

A primary feature of the invention lies in the use of a liquid starter in contradistinction to the conventional sponge starter. Thereby a plurality of advantages are gained.

A principal defect of the conventional sponge system lies in its rigidity of scheduling. When the sponge has been developed, it must be used within a short time, i.e., within 1 to 3 hours after reaching the peak of development, depending on its temperature. If this is not done, its content of both yeast and souring bacteria will decrease in both numbers and activity so that bread prepared therewith will not rise properly and will not have the desired degree of sourness. This rigidity of scheduling, in turn, gives rise to problems in matching output with demand, for example, increasing output during holiday seasons and decreasing output during post-holiday lulls or the like. On the other hand, the liquid starter of the invention provides a desirable flexibility of scheduling. Important in this respect is that the liquid starter can be readily cooled, for example, to about 50° F., whereby to prevent decrease in vigor and numbers. The liquid starter is relatively stable when so cooled and can be held for 24–48 hours without significant deterioration. Foreseeing periods of increased demand, large batches of the liquid starter can be prepared, then held at about 50–55° F. until they are needed. In this connection, it may be noted that because of its fluid nature the starter of the invention can be easily cooled—good heat transfer rates are attained when it is contacted with a cold surface such as a refrigerated coil or jacket. This is in sharp contrast to a conventional sponge which, because of its doughy nature, is difficult to cool—indeed difficult to even move it so that it could properly contact a cooled surface.

The conventional sponge because of its doughy nature is difficult to convey and mix into the bread formulation. In contrast, the liquid starter of the invention is amenable to handling like any other liquid. For introduction into the bread information, it can be metered and pumped in conventional equipment used for handling food liquids or slurries. Thus, by using the liquid starter of the invention, the conveying and metering operations of the bakery are simplified and made more efficient.

In making up batches of conventional sponge, it is necessary (because of the sticky, viscous nature of the material) to use dough-mixing equipment to ensure proper blending of the ingredients. Such equipment is not only expensive in initial and operating costs, but also takes out of operation equipment that may be needed at the same time to make up batches of bread dough. The liquid starter of the invention, however, can be made up in simple and relatively inexpensive equipment such as a tank provided with an ordinary electric stirrer. Thus, in a bake shop geared to use the liquid starter of the invention, the dough mixers can be reserved for their proper use (mixing dough) and make-up of starter carried out in inexpensive tanks equipped with stirrers. As a result, the total procedure is made more efficient and the steps of make-up of starter and make-up of dough can be carried out independently of one another.

The fact that conventional sponges must be made up in a dough mixer additionally means that the size of each batch is limited. Because of the limited size of currently available dough mixers, the largest batch of sponge which can be prepared at one time is about 1000 lbs. The liquid sponge of the invention is not subject to any such restriction—one can make up a batch of any size, limited only to the volume of the tank used.

The conventional sponge system is geared to the use of a portion of a previous sponge which serves as the inoculum and also to provide necessary strength and structure to the bread dough. This means that a bakery using the usual technique is under a continual threat that their production may be interrupted by loss of their sponge due to contamination with extraneous bacteria, yeast, or phages. On the other hand, the liquid starter of the invention is more adaptable to starting from scratch as it can be inoculated either with a portion of previous starter or with pure cultures of the necessary microorganisms. In this way, if a batch of starter should go bad or show signs of improper leavening or souring effects, the situation can be remedied by making up a new starter, using pure cultures as the inoculum.

The conventional system requires that each new batch of sponge be made up with a high gluten flour, i.e., one which contains about 14% of protein. This requirement is eliminated in the process of the invention—the liquid starter can be made with any standard bread flour which contains at least about 11 to 11.5% of protein.

PREPARATION OF LIQUID STARTER

In preparing the liquid starter of the invention, the basic ingredients are flour, water, and an inoculum. As noted previously, the ingredients may be blended in a tank equipped with a power-driven agitator or the like.

The proportion of water to flour may be varied within certain limits. If the proportion of water is too high, the microorganisms do not proliferate at the proper relative rates; the bacteria will grow more rapidly than the yeast with the end result that the product is unsatisfactory. It will provide too much acidifying effect and not enough leavening action on the dough to which it is added. On the other hand, if the proportion of water is too low, one will not achieve the goal of attaining a liquid product which can be readily metered, pumped, cooled, etc. Our investigations have indicated that good results—as to both rates of growth of the microorganisms and retention of liquidity—are obtained when one uses about 150 to about 300 parts, preferably 250 parts, of water per 100 parts of flour.

The inoculum may be any of various kinds. Where the system has been established, the inoculum is preferably a portion of developed liquid starter from a previous batch. Alternatively, one may add pure cultures of the necessary microorganisms, namely, *Torulopsis holmii* and *Lactobacillus sanfrancisco.* Another but less preferable plan is to inoculate the slurry with a portion of conventional developed sour dough sponge or a portion of proofed sour bread dough. This procedure is useful, for example, where the liquid starter system of the invention is being initiated or where a conventional sponge system is being converted into the liquid starter system of the invention. Regardless of the kind of inoculum used, it is necessary that it contain the needed organisms (*T. holmii* and *L. sanfrancisco*) in such amount that the liquid starter can be developed within a reasonable time, i.e., about 6 to 8 hours. This result is readily attained when the inoculum is added in such amount as to provide in the liquid starter at zero (make-up) time a concentration of the yeast cells of about 1 to 5 million per gram and a concentration of the bacterial cells about 30 to 100, preferably 50, times greater. During the development period each of the organisms increases approximately 10-fold. Thus, in a typical case the initial concentrations will be $2 \times 10^6$ yeast cells/gram and $1 \times 10^8$ bacterial cells/gram; after development the concentrations will be on the order of $20 \times 10^6$ yeast cells/gram and $10 \times 10^9$ bacterial cells/gram.

An important ingredient in the liquid starter is salt (NaCl) which we found has the critical effect of maintaining the yeast and bacteria growth rates in the proper relationship. Because the starter of the invention contains a much higher proportion of water than the conventional sponge, there is a tendency for bacterial growth to outstrip yeast growth. The addition of salt counteracts this tendency by preferentially accelerating yeast growth. To attain this desirable effect when the liquid starter of the invention is made up, one includes about 1 to 3% of salt, based on the amount of flour.

During make-up of the liquid starter of the invention, it is preferable to adjust the pH to about 5. For this purpose one may use acetic, lactic, hydrochloric, or any other non-toxic acid. This lowering of the pH has the desirable effect of suppressing growth of any adventitious microorganisms which may be present in the make-up materials, for example, the flour. The low pH, however, has little or no adverse effect on the growth of the desirable organisms, the sour dough yeast and bacteria, since these can proliferate in media having pH's well below 5. It may be noted that where the liquid starter is made up with previously developed liquid starter as the inoculum, the pH will be close to 5, and hence acid need not be added.

After the liquid starter has been made up, it is developed to cause multiplication of the yeast and bacteria, and development of the gluten in the flour. No special apparatus is required for the development; the starter may be left in the tank wherein it was made up and agitation applied at a just sufficient speed to keep the flour from settling. The top of the tank is kept closed to avoid contamination. The development may be carried out over a wide temperature range—about from 55 to 80° F.—with the understanding that multiplication of the organisms takes place faster at the higher temperatures of the said range. The fully developed starter usually has a pH of 3.8 to 4.0. We prefer to use a temperature of 75 to 80° F. for the development, whereby to attain a high rate of cell multiplication combined with stability of the organisms when they reach peak development. A most preferable technique is to start the development at a temperature somewhat below 80° F.—say 75° F.— and rely on the autogenous heating of the system to bring it to 80° F. as the peak of development is achieved, which will be in about 6–7 hours. The starter is then ready for use in preparing dough. It is, of course, obvious that a portion of the developed starter is retained for use as the inoculum for preparing a next batch of starter, thus to perpetuate the system.

In the event that the developed liquid starter is not needed directly after it has been developed, it may be cooled to about 50 to 55° F., and held at such temperature until it is required for dough preparation. If the starter is to be held for an extended time, it is preferable to reduce the development time, for example, to about 2 to 4 hours, and then cool it to 50–55° F., and hold it at such temperature until it is to be used.

Typical make-up formulations for liquid starters within the scope of the invention are given in the following examples:

EXAMPLE 1

Using previous liquid starter

| | Parts |
|---|---|
| Flour | 100 |
| Water | 250 |
| Previously developed liquid starter | 38 |
| Salt | 2 |

Adjust pH to 5 with acetic acid (optional).

EXAMPLE 2

Using pure cultures

| | Parts |
|---|---|
| Flour | 100 |
| Water | 250 |
| Pure cultures (see below). | |
| Salt | 2 |

Adjust pH to 5 with acetic acid (optional).

The pure cultures used are those of *Torulopsis holmii* and of *Lactobacillus sanfrancisco*. Enough of the cultures are provided to furnish approximately the following concentrations of these organisms in the liquid starter:

*T. holmii*: About $2 \times 10^6$ cells/g.
*L. sanfrancisco*: About $1 \times 10^8$ cells/g.

EXAMPLE 3

Using conventional sponge as inoculum

| | Parts |
|---|---|
| Flour | 100 |
| Water | 250 |
| Conventional developed sponge | 20 |
| Salt | 2 |

Adjust pH to 5 with acetic acid (optional).

Hereinabove, it has been noted that the liquid starter may be inoculated with pure cultures of the necessary microorganisms. Procedures for preparing such inocula are provided below by way of illustration and not limitation.

EXAMPLE 4

Preparation of pure cultures of the sour dough bacteria, *L. sanfrancisco*

The bacteria in question grows well on a broth containing the following ingredients:

Sour dough bacteria (SDB) broth

| | Percent |
|---|---|
| Maltose | 2 |
| Commercial yeast extract | 0.3 |
| Fresh yeast extractives (FYE)* | 0.5 to 1.5 |
| Sorbitan polyoxyethylene monooleate (Tween 80) | 0.03 |
| Casein hydrolysate (Trypticase) | 0.06 |
| Water | To make 100 |

*Prepared by autoclaving a 20% suspension of commercial compressed baker's yeast in distilled water for 30 minutes at 15 p.s.i., allowing the suspension to settle overnight at 34–35° F., decanting and further clarifying the supernatant by centrifugation. The extract prepared in this manner contained 1.5% solids and if not to be used within a few days, was frozen or freeze-dried immediately. The FYE preparations are used in a proportion to furnish 0.5 to 1.5% of the dry FYE solids.

Adust to pH 5.6 with 20% lactic acid or acetic acid or 1 to 6 N HCl.

The broth is sterilized by autoclaving it, cooled, and inoculated with about 1% of a broth culture of the bacteria, then incubated at about 80° F. for 1 or 2 days. Since growth of the bacteria is stimulated by $CO_2$, it is preferably to carry out the culture in an atmosphere containing some $CO_2$. This may be done by flushing air out of the top of the culture vessel with $CO_2$ and then stoppering the vessel. Alternatively, the vessel can be placed within a receptacle containing about 25 to 95 volume percent of $CO_2$ (the remainder, air). Alternatively, one may sparge the culture with such gas mixture. During the culture the system is preferably agitated or shaken slowly to get good contact between the growing cells and the nutrients.

The bacterial cells are harvested by centrifuging the broth culture, preferably using a refrigerated centrifuge. The centrifuge cake is then washed with chilled 1% aqueous salt solution to remove nutrients, metabolic products, etc. The washed cells can then be used as the bacterial inoculum for liquid starter make-up.

If the cells are not needed a short time after preparation, they may be preserved as follows:

The washed cells (100 parts) are suspended in 200 parts of a stabilizing carrier (a mixture of glycerol and sterile SDB broth) and the suspension is flash frozen, using liquid $N_2$ or Dry Ice-acetone slush. The culture is then held in a frozen state (about $-20°$ F. or below), whereby it retains its viability for at least 2 months. When the product is to be used, it is thawed and used directly.

Further details on preparation of cultures of *L. sanfrancisco* are disclosed in our copending application referred to above. Methods whereby this species may be isolated from source materials such as sour dough sponges are also disclosed in said application.

Cultures of several strains of *Lactobacillus sanfrancisco* useful for the purpose of the invention have been deposited in the Stock Culture Collection of the U.S. Department of Agriculture, Northern Regional Research Laboratory, Peoria, Ill. 61604, from which organization samples of these strains may be obtained.

EXAMPLE 5

Preparation of pure culture of the sour dough yeast, *T. holmii*

The yeast in question grows well on many media, including those used for growing commercial baker's yeast. We have routinely cultured the organism on the following broth:

|  | Percent |
|---|---|
| Glucose | 2 |
| Yeast extract | 0.5 |
| Casein hydrolysate (Trypticase) | 1 |
| Water | To make 100 |

The broth is sterilized by autoclaving it, cooled, and inoculated with about 1% of a broth culture of the yeast, then incubated at about 86° F. for 1 or 2 days under highly aerobic conditions.

The yeast cells are harvested by centrifugation or filtration, then washed with chilled 1% aqueous salt solution to remove nutrients, metabolic products, etc. The washed cells can be used directly or stored in the refrigerator for future use. For longer storage, the yeast can be dried—this is preferably done by extruding it through a die to form noodle-like filaments which are dried to a moisture content of about 8% in a current of air at about 100–140° F. To prevent loss of viability, the temperature of the air during the last part of the drying cycle is kept in the lower portion of the stated range, or, alternatively, the humidity of the air stream is increased while keeping the temperature high.

Cultures of several strains of *Torulopsis holmii* useful for the purpose of the invention have been deposited in the Stock Culture Collection of the U.S. Department of Agriculture, Northern Regional Research Laboratory, Peoria, Ill. 61604, from which organization samples of the strains may be obtained. The strains are designated as Nos. NRRL Y–7244, Y–7245, Y–7246, Y–7247, and Y–7248. As noted above, in the sporulating form the yeast may be termed *Saccharomyces exiguus*.

Preparation of bread

In utilizing the liquid starter of the invention, a dough is first prepared therewith, using a formulation which differs from the conventional system as expalined below. However, when the dough has been made up, the subsequent steps such as relaxing, initial proofing, scaling, molding, proofing, slashing, baking, etc. are all carried out in conventional manner.

In preparing a dough, the basic ingredients are flour, the liquid starter, and, usually, addititional water. With any given amount of flour, the amount of liquid starter may be varied depending primarily on the proof time desired for the dough. A higher proportion of liquid starter will shorten the proof time, and vice versa. To fit into generally established proof times of about 6 to 8 hours, it is preferred to use about 30–40 lbs. of the liquid starter (per 100 lbs. of flour) or enough to provide a dough containing on the order of 3 million sour dough yeast cells per gram and about 30 to 50 times that concentration of the sour dough bacterial cells.

The amount of water to be added will depend on the water added with the liquid starter and the water absorption of the flour. The water absorption of the flour can be determined by the usual methods, for example, by Farinograph measurements. In general, we have observed that best results are obtained when the total amount of water (that added as such plus that in the liquid starter) is about 5 or 6% less than that calculated from the water absorption of the flour being used.

Salt is also added to the dough to provide about 2 parts thereof (per 100 parts of flour), including the amount added with the liquid starter.

For developing a proper structure in the bread, a conventional oxidant is added to the dough. In general, we add about 50 parts per million of an oxidant such as potassium bromate or iodate or ascorbic acid or azodicarbamide. A preferred oxidant is 35 p.p.m. of $KBrO_3$ and 15 p.p.m. of $KIO_3$. The oxidant is preferably incorporated into the dough in the form of a dilute aqueous solution, this water being taken into account in figuring the total water-to-flour ratio in the dough. Alternatively, the oxidant can be added in wafer or tablet form.

Following formulation of the dough as described above, it is further processed as by proofing, baking, etc., all in conventional manner.

The preparation of bread, using the liquid starter of the invention, is demonstrated by the following illustrative example.

EXAMPLE 6

A liquid starter was made by mixing together the ingredients listed below, and then developing it for about 6.5 hours at 75–80° F.

|  | Lbs. |
|---|---|
| Flour (high-gluten) | 10 |
| Water | 25 |
| Fully developed sour dough sponge | 2 |
| Salt | 0.2 |

A dough was then prepared from the developed liquid starter, using the following formulation:

|  | Lbs. |
|---|---|
| Flour (standard bread) | 75 |
| Liquid starter | 28.7 |
| Water | 30.2 |
| Salt | 1.392 |
| 0.1% aq. sol. of $KBrO_3$ | 2.922 |
| 0.1% aq. sol. of $KIO_3$ | 1.252 |

The dough was mixed for about 5 minutes in a conventional dough mixer, then allowed to relax for 30 minutes. The dough was next scaled (divided into pieces by weight), and given an overhead proof for 20 minutes at 90° F. The loaves were then molded, placed on canvas and proofed about 6.5 hours at 85–90° F. Finally, the loaves were slashed and baked in a steam-saturated oven. Except for the different dough formulation, all the operations from dough mixing through baking were carried out as conventional in the preparation of sour dough French bread by the usual sponge method.

The following observations were made on the operation. The dough handled better (was less sticky) for scaling, molding, and transfer to the oven than conventional doughs. Our loaves displayed a better oven spring, that is, they increased to a larger volume than conventional doughs. With regard to taste, the finished bread was rated equal to or better than conventional sour dough French bread.

Having thus described our invention, we claim:

1. A process for preparing a liquid starter for producing sour dough French bread, which comprises
   (a) forming a slurry consisting solely of water, salt, and flour, in the proportions of about 150 to about 300 parts of water per 100 parts of flour, and about 1 to about 3 parts of salt per 100 parts of flour,
   (b) inoculating the slurry with viable cells of sour dough yeast, *Torulopsis holmii*, in a concentration of about 1 to 5 million cells per gram, and viable cells of sour dough bacteria, *Lactobacillus sanfrancisco*, in a concentration about 30 to 100 times greater than that of the yeast cells, and (c) developing the inoculated slurry by holding it with agitation at a temperature of about 55–80° F. to cause proliferation of the added microorganisms.

2. The process of claim 1 wherein the slurry is acidified at the start to a pH of about 5 by addition of a non-toxic acid.

3. The process of claim 1 wherein the inoculation is with a portion of a liquid starter from a previous batch.

4. The process of claim 1 wherein the inoculation is with cells of the stated organisms in a state free from amylaceous materials.

5. The process of claim 1 wherein the inoculation is with pure cultures of the stated microorganisms.

6. The process of claim 1 wherein the development is at an initial temperature of about 75° F. and a final temperature of about 80° F.

7. The process of claim 1 wherein following step (c), the slurry is cooled to about 50 to 55° F., and held at that temperature for future use.

8. A liquid starter useful for the production of sour dough French bread, being the product prepared by
  (a) forming a slurry consisting solely of water, salt, and flour, in the proportions of about 100 to about 300 parts of water per 100 parts of flour, and about 1 to about 3 parts of salt per 100 parts of flour,
  (b) inoculating the slurry with viable cells of sour dough yeast, *Torulopsis holmii*, in a concentration of about 1 to 5 million cells per gram, and viable cells of sour dough bacteria, *Lactobacillus sanfrancisco*, in a concentration about 30 to 100 times greater than that of said yeast cells, and
  (c) developing the inoculated slurry by holding it with agitation at a temperature of about 55–80° F. until the concentration of said yeast is about 10 to 50 million cells per gram and the concentration of said bacteria is about 30 to 100 times greater than that of said yeast.

9. In the process of preparing sour dough French bread wherein a dough is formulated with a starter to provide the necessary leavening and souring action, and the dough subjected to a series of steps including dividing, proofing, and baking, the improvement which comprises formulating the dough with a liquid starter prepared by
  (a) forming a slurry consisting solely of water, salt, and flour, in the proportions of about 150 to about 300 parts of water per 100 parts of flour, and about 1 to about 3 parts of salt per 100 parts of flour,
  (b) inoculating the slurry with viable cells of sour dough yeast, *Torulopsis holmii*, in a concentration of about 1 to 5 million cells per gram, and viable cells of sour dough bacteria, *Lactobacillus sanfrancisco*, in a concentration about 30 to 100 times greater than that of said yeast cells, and
  (c) developing the inoculated slurry by holding it with agitation at a temperature of about 55–80° F. until the concentration of said yeast is about 10 to 50 million cells per gram and the concentration of said bacteria is about 30 to 100 times greater than that of said yeast.

References Cited

UNITED STATES PATENTS 2,857,280   10/1958   Williams et al. _____ 99—90 S X

OTHER REFERENCES

Kline et al., "Nature of the San Francisco Sour Dough French Bread Process," The Bakers Digest, April 1970, pp. 48–53, 56 and 57.

RAYMOND N. JONES, Primary Examiner

J. R. HOFFMAN, Assistant Examiner

U.S. Cl. X.R.

99—90 R